United States Patent [19]

Morikawa et al.

[11] Patent Number: 4,907,549
[45] Date of Patent: Mar. 13, 1990

[54] SCAVENGING SYSTEM FOR A TWO-STROKE-CYCLE ENGINE

[75] Inventors: Koji Morikawa, Musashino; Hideo Watanabe, Tokyo, both of Japan

[73] Assignee: Fuji Jukogyo Kabushiki Kaisha, Tokyo, Japan

[21] Appl. No.: 341,148

[22] Filed: Apr. 20, 1989

[30] Foreign Application Priority Data

| Apr. 30, 1988 | [JP] | Japan | 63-059601[U] |
| Apr. 30, 1988 | [JP] | Japan | 63-109500 |
| Apr. 30, 1988 | [JP] | Japan | 63-109503 |
| Apr. 30, 1988 | [JP] | Japan | 63-109504 |

[51] Int. Cl.$^4$ .............................. F02B 33/00
[52] U.S. Cl. .............................. 123/65 BA; 123/559.1
[58] Field of Search ............. 123/65 BA, 65 B, 559.1

[56] References Cited

U.S. PATENT DOCUMENTS

| 2,405,350 | 8/1946 | Gadoux et al. | 123/65 BA |
| 2,766,744 | 10/1956 | Steiger | 123/65 BA |
| 2,891,524 | 6/1959 | Scheiterlein | 123/65 BA |
| 2,924,069 | 2/1960 | Buchi | 123/65 BA |
| 3,327,693 | 6/1967 | Lundquist | 123/65 BA |
| 4,157,080 | 6/1979 | Hill | 123/65 BA |

FOREIGN PATENT DOCUMENTS

| 906032 | 7/1949 | Fed. Rep. of Germany | 123/65 BA |
| 57-203821 | 12/1982 | Japan . | |
| 0118027 | 5/1987 | Japan | 123/52 M |
| 0094027 | 4/1988 | Japan | 123/52 M |

Primary Examiner—David A. Okonsky
Attorney, Agent, or Firm—Martin A. Farber

[57] ABSTRACT

A two-stroke engine has a scavenge pump provided in an intake passage. A continuously variable transmission is operatively connected between the scavenge pump and a crankshaft of the engine for operating the scavenge pump. An actuator is provided for changing the transmission ratio of the transmission. The actuator is operated by a controller so as to control the speed of the transmission ratio in accordance with load on the engine.

8 Claims, 13 Drawing Sheets

SCAVENGING SYSTEM FOR A TWO-STROKE-CYCLE ENGINE

BACKGROUND OF THE INVENTION

The present invention relates to a scavenging system for a two-stroke-cycle engine with a scavenge pump.

As the simplest method of producing scavenge air, a crankcase scavenging system is generally used.

In an ordinary crank-case-scavenged two-stroke engine, a vacuum is produced in an enclosed crankcase of the engine to draw in a fresh air when a piston ascends. When the piston descends, burned gas is discharged through an exhaust port while the fresh air in the crankcase is admitted into a cylinder, thereby scavenging the cylinder. However, at light engine load, since intake air quantity is small, the scavending becomes insufficient, resulting in misfire and hence in an irregular engine operation. In addition, a torque characteristic corresponding to the engine operating conditions becomes unstable. Moreover, at a heavy engine load, volume of the crankcase is insufficient for scavenging.

In order to resolve such problem, a two-stroke engine with a separate scavenge pump is used. Japanese Patent Application Laid-Open 57-203821 discloses a two-stroke engine which is provided with a scavenge pump. The scavenge pump is driven by the crankshaft to generate a scavenge pressure thereby delivering a sufficient amount of fresh air into the cylinder.

The engine is provided with a direct fuel injection system so as to prevent the fuel from escaping through the exhaust port.

Since the scavenge pump which is also used for reducing inertia of the reciprocating piston of the engine is driven at the same speed as the crankshaft, scavenge pressure becomes insufficient for scavenging in low speed range of the engine.

SUMMARY OF THE INVENTION

The object of the present invention is to provide a two-stroke engine where engine torque is smoothly controlled in accordance with the load on the engine while sufficiently scavenging cylinders at any engine operating condition.

According to the present invention, there is provided a system for scavenging for a two-stroke engine having at least one cylinder, a scavenge port, an exhaust port, an intake passage communicated with the scavenge port, an exhaust passage communicated with the exhaust port, a fuel injector, and a scavenge pump provided in the intake passage.

The system comprises a transmission ratio changing means operatively connecting the scavenge pump and a crankshaft of the engine for operating the scavenge pump, an actuator for changing the transmission ratio of the transmission, sensing means for detecting load on the engine and for producing a load signal, control means responsive to the load signal for operating the actuator so as to control the speed increasing ratio of the transmission in accordance with the load.

In an aspect of the invention, the control means is provided for changing the transmission ratio with the load change.

In another aspect, the continuously variable transmission is used for changing the transmission ratio.

These and other objects and features of this invention will become understood from the following description with reference to the accompanying drawings.

DETAILED DESCRIPTION OF THE PREFERRED EMBODIMENTS

Figure 1:
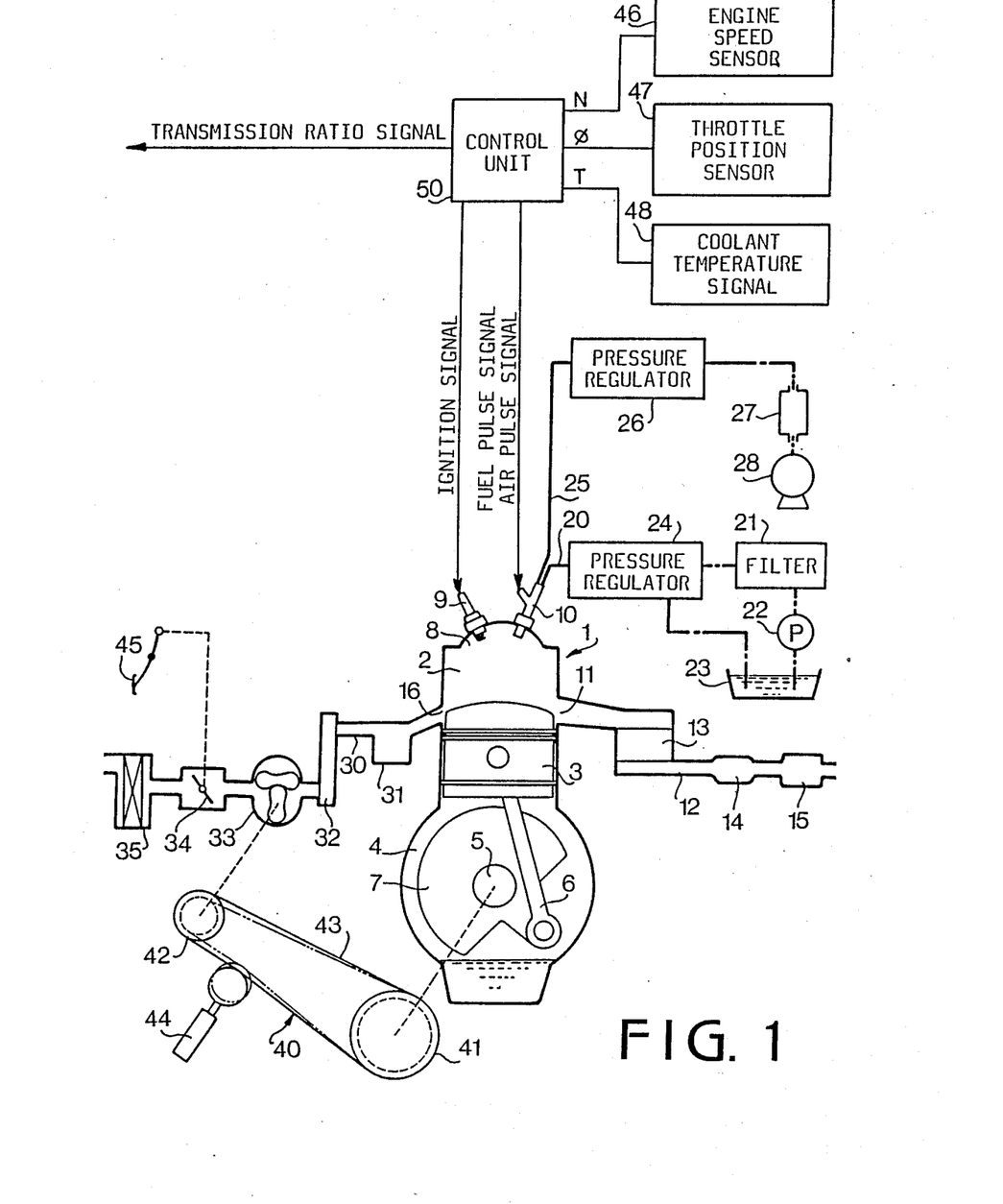
FIG. 1 is a schematic diagram of a two-stroke engine of the present invention.

Referring to FIG. 1, a two-stroke engine 1 comprises a cylinder 2, a piston 3 provided in the cylinder 2, a connecting rod 6 connected with the piston 3 and a crankshaft 5 disposed in a crankcase 4. A counterweight 7 is mounted on the crankshaft 5 so as to reduce the inertia of the piston 3 reciprocating in the cylinder 2.

In a wall of the cylinder are formed an exhaust port 11 and a scavenge port 16 in 90 degrees angular disposition or opposing one another. The ports 11 and 16 are adapted to open at a predetermined timing with respect to the position of the piston 3.

A fuel injector 10 and a spark plug 9 are provided on a top of a combustion chamber 8 of the cylinder 2. The injector 10 is a type where a predetermined amount of fuel is injected together with air by compressed air in the form of air-fuel mixture. Fuel in a fuel tank 23 is supplied to the injector 10 through a fuel passage 20 having a filter 21, a pump 22 and a pressure regulator 24 for constantly maintaining the fuel at a predetermined low fuel pressure. The fuel is mixed with air supplied to the injector 10 through a compressor 28 passing through an air passage 25 having an accumulator 27 and a pressure regulator 26.

The engine 1 is supplied with air through an air cleaner 35, a throttle valve 34 operatively connected with an accelerator pedal 45, a displacement scavenge pump 33, an intercooler 32 for cooling scavenge air, an intake pipe 30 having a scavenge chamber 31 for absorbing scavenge pressure waves when the scavenge port 16 is opened or closed. Exhaust gas of the engine 1 is discharged passing through the exhaust port 11, an exhaust pipe 12 having a catalytic converter 13, an exhaust chamber 14 and a muffler 15.

The scavenge pump 33 is operatively connected to the crankshaft 5 through a continuously variable belt-drive transmission (CVT) 40. The CVT 40 comprises an endless belt 43 running over a crank pulley 41 and a pump pulley 42.

The pump pulley 42 has a pair of conical pulleys one of which is a fixed pulley and the other is an axially movable pulley. The belt 43 engages between both conical pulleys. An actuator 44 is provided for laterally pushing the belt 43 for automatically changing the running diameter of the belt on the pulley 42 in dependency on a transmission signal from a control unit 50. The control unit 50 is supplied with an engine speed N from an engine speed sensor 46, a throttle position $\theta$ from a throttle position sensor 47 and a coolant temperature T from a coolant temperature sensor 48. The control unit 50 further feeds an ignition signal, an air injection pulse signal and a fuel injection pulse signal to the spark plug 9 and the injector 10, respectively.

Figure 2:
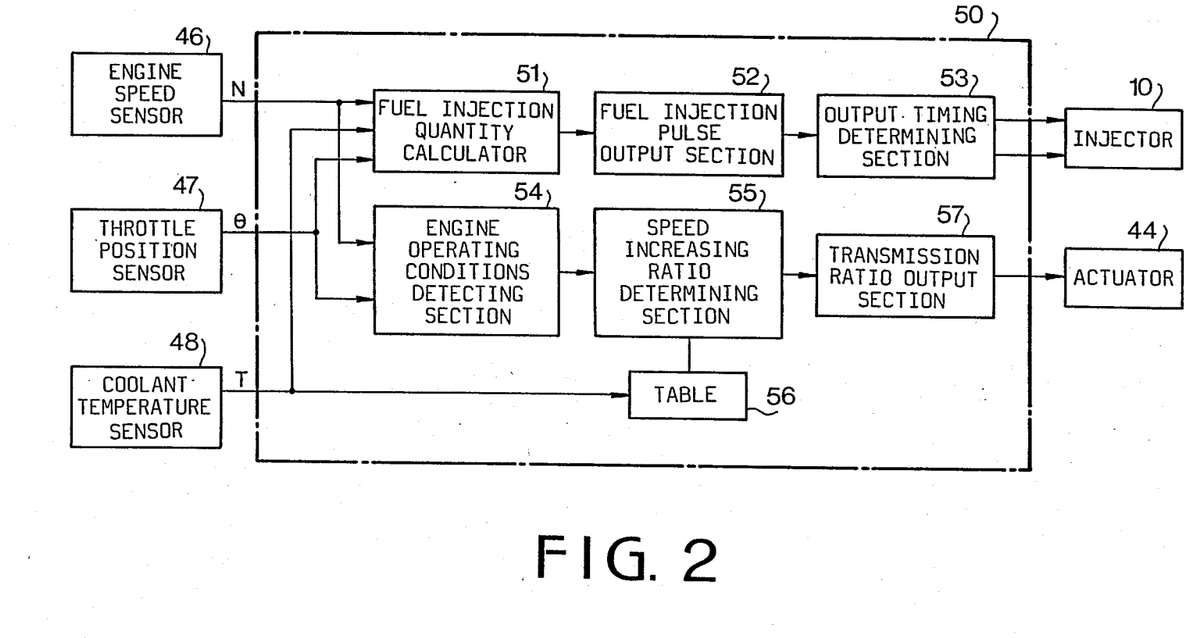
FIG. 2 is a block diagram showing a control unit according to the present invention.
Figure 3A:
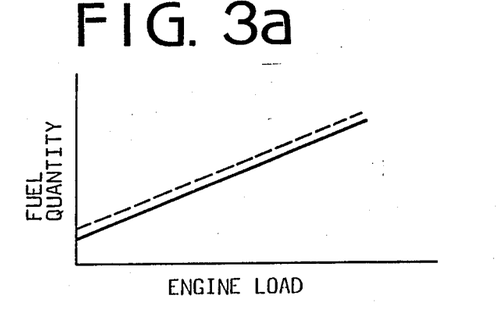
FIG. 3a is a graph showing a relationship between quantity of fuel and engine load.

Referring to FIG. 2, the control unit 50 comprises a fuel injection quantity calculator 51 which calculates a fuel injection quantity in dependency on engine operating conditions represented by engine speed N and throttle position $\theta$. FIG. 3a shows a relationship between engine load and fuel injection quantity. A fuel injection pulse width corresponding to the calculated fuel quantity is determined at a fuel injection pulse output section 52. The output section 52 applies a fuel injection pulse signal to an output timing determining section 53 where output timings of fuel and air injections are determined. Thus, the fuel injector 10 is applied with a fuel injection pulse signal and an air injection pulse signal to inject a dose of fuel.

Figure 3B:
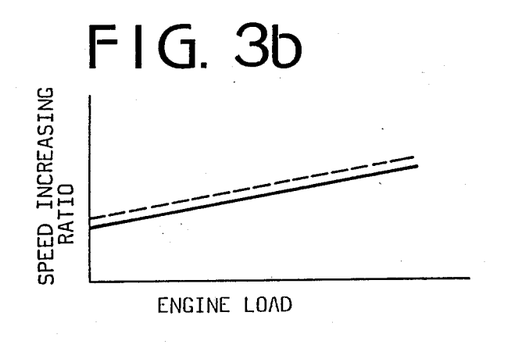
FIG. 3b is a graph showing a relationship between transmission ratio of a CVT and engine load.
Figure 3C:
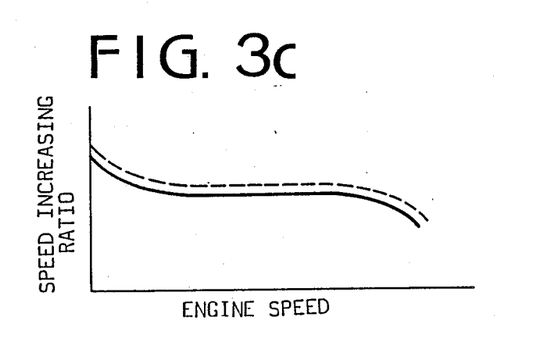
FIG. 3c is a graph showing a relationship between the transmission ratio and engine speed.

The control unit 50 further comprises an engine operating condition detecting section 54 to which engine speed N and throttle position $\theta$ are applied. In a transmission ratio determining section 55, a speed increasing ratio is derived from a table 56 in accordance with engine operating conditions detected at the detecting section 54. As shown in FIG. 3b the speed increasing ratio linearly increases as a function of the engine load, represented by throttle position $\theta$. On the other hand, the speed increasing ratio is large in a low engine speed range and small in a high engine speed range as shown in FIG. 3c. A transmission ratio signal corresponding to the derived speed increasing ratio is applied to the actuator 44 of the transmission 40 through a transmission ratio output section 57.

The coolant temperature T from the coolant temperature sensor 48 is applied to the fuel injection quantity calculator 51 and the table 56 in order to correct the transmission ratio and the fuel injection pulse width at cold engine. As shown by dotted lines in FIGS. 3a to 3c, at the cold engine, the fuel and the transmission ratio are increased.

The operation of the two-stroke-cycle engine is described hereinafter.

When the piston 3 is positioned close to the bottom dead center as shown in FIG. 1, the scavenge port 16 is opened as well as the exhaust port 11 so that intake air, quantity of which depends on the position of the throttle valve 34, is delivered by the scavenge pump 33 into the cylinder 2 through the intercooler 32 and the intake port 16. Consequently, burned gas in the cylinder 2 is scavenged so that fresh intake air is admitted therein in a short time. During the compression stroke, the piston 3 rises, closing both ports 11 and 16. A dose of fuel accumulated in the injector 10 in accordance with the fuel injection pulse signal from the control unit 50 is injected by the compressed air, which is supplied in accordance with the air pulse signal, as air-fuel mixture. The mixture is swirling in the combustion chamber with the scavenging air and ignited by the spark plug 9 immediately before the top dead center. After the explosion, the piston 3 decends for the power stroke. Accordingly, the exhaust port 11 is opened so that burned gas in the cylinder 2 which is still under high pressure escapes. The piston 3 further decends, thereby returning to the afore-described intake stroke where cylinder 2 is scavenged.

Figure 4:
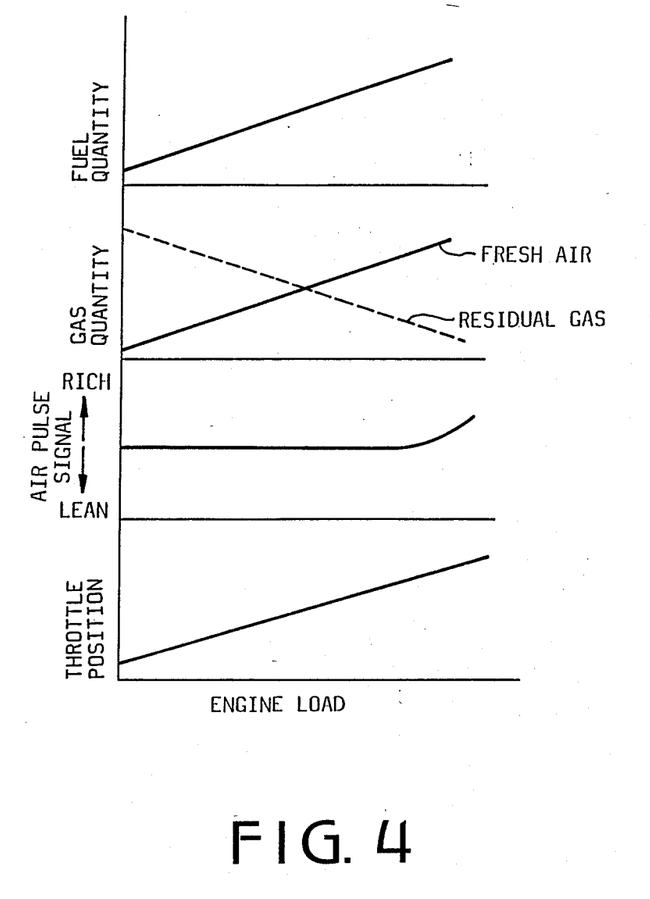
FIG. 4 is a graph showing characteristics of fuel quantity, gas quantity, air-fuel ratio and throttle position in accordance with engine load.
Figure 5A:
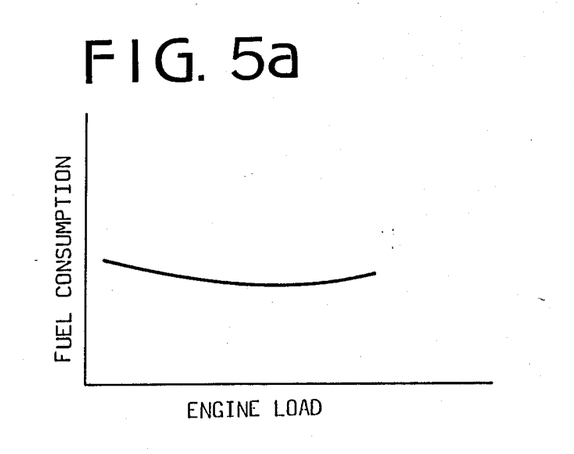
FIG. 5a is a graph showing a relationship between fuel consumption and engine load.

During the operation, the position $\theta$ of the throttle valve 34 changes with the load on the engine in accordance with depression of the accelerator pedal 45, thereby controlling the quantity of scavenging air in the cylinder 2. In order to control the scavenging pressure under which fresh air is supplied to the cylinder 2, the speed of the scavenge pump 33 is controlled. Namely, the scavenge pump is driven by the crankshaft 5 through the transmission 40 at a higher speed than that of the crankshaft in accordance with the transmission ratio increasing speed of the transmission 40, which is controlled by the actuator 44. More particularly, the actuator 44 pushes the belt 43 in accordance with the transmission ratio signal from the control unit 50 so that the running diameter on the pulley 42 changes as shown by a chain line in FIG. 1. Thus, the scavenge pump 33 is driven at an optimum speed. The fresh air flows into the cylinder 2 in accordance with the engine load so that proper quantity of burned gas remains in the cylinder 2 as shown in FIG. 4. Since the quantity of fuel is also controlled in dependency on the engine load, the air-fuel ratio becomes substantially constant. A proper quantity of fresh air-fuel mixture having a constant air-fuel ratio is produced in dependency on the engine driving conditions so that fuel consumption is improved as shown in FIG. 5a.

Figure 5B:
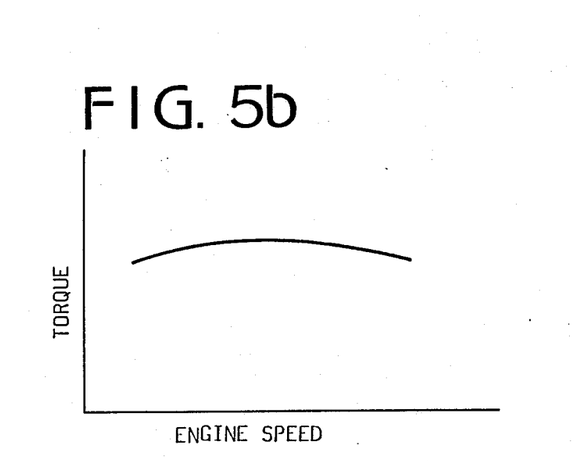
FIG. 5b is a graph showing a relationship between engine torque and engine speed.

Furthermore, since the speed of the pump 33 increases in a heavy engine load range at a low engine speed as shown in FIGS. 3b and 3c, the scavenging pressure rises so that the cylinder 2 is sufficiently scavenged. On the other hand, in a high engine speed range, the transmission ratio increasing speed of the transmission 40 is decreased. Accordingly, torque characteristic of the engine 1 becomes substantially flat relative to the engine speed as shown in FIG. 5b.

At cold engine, quantity of fuel and the transmission ratio increasing speed are increased to produce rich air-fuel mixture. Thus, the engine 1 is preferably warmed-up.

Figure 6A:
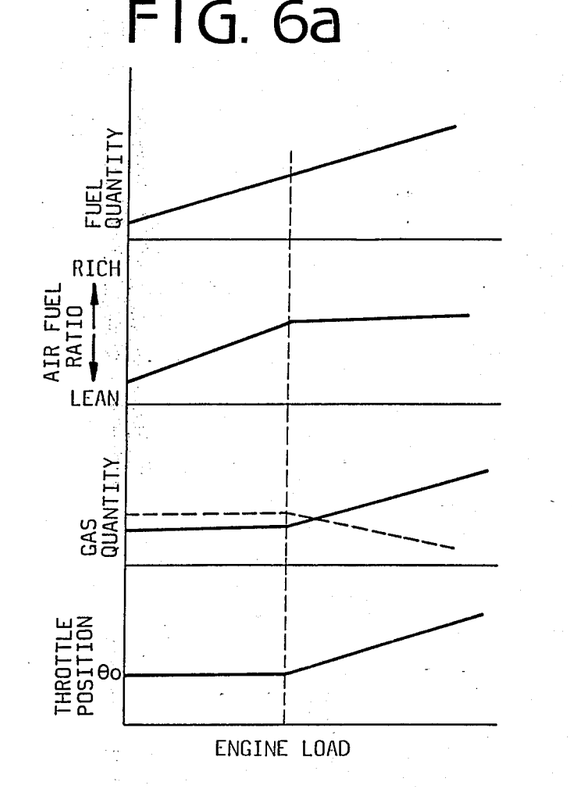
FIG. 6a is a graph showing characteristics of fuel quantity, gas quantity, air-fuel ratio and throttle position in accordance with engine load in a modification of the invention.
Figure 6B:
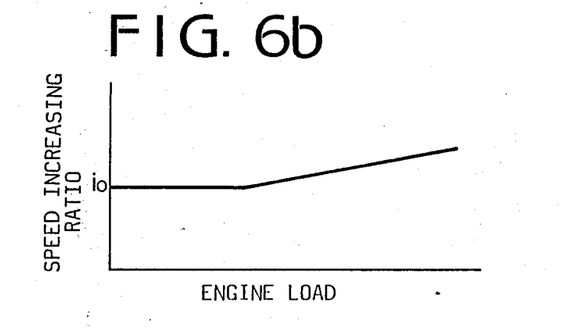
FIG. 6b is a graph showing a relationship between transmission ratio and engine load in the modification.

In a modification of the present invention, in a light engine load range, the throttle position $\theta$ is maintained at a small degree $\theta_0$ and the transmission ratio is simultaneously maintained at $i_0$ as shown in FIGS. 6a and 6b. On the other hand, since the fuel is gradually decreased with the decrease of the load, the air-fuel mixture becomes lean. As a result, the amount of residual burned gas is decreased so that proper amount of fresh air is constantly supplied to the cylinder 2.

Figure 7:
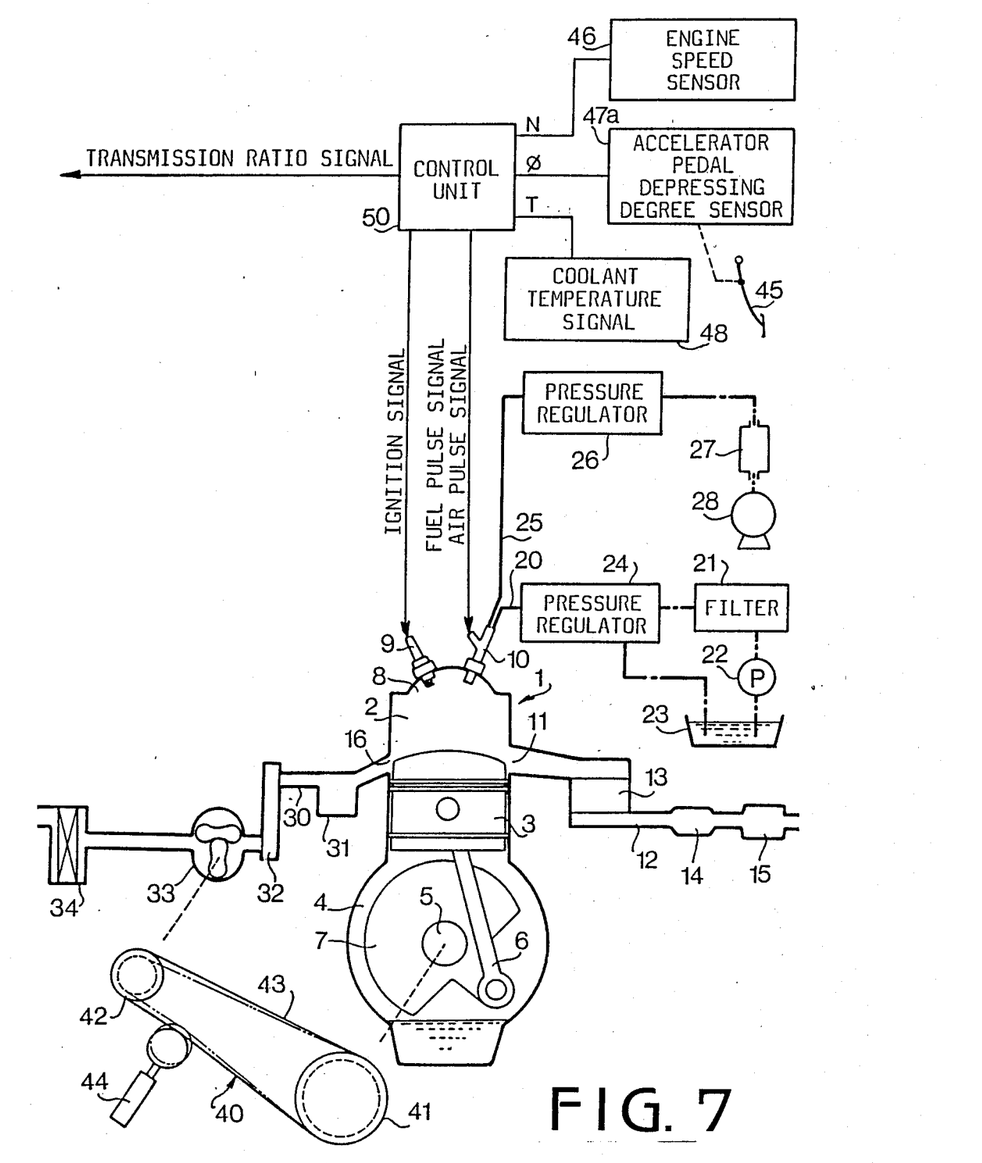
FIG. 7 is a schematic diagram of a two-stroke engine of a second embodiment of the present invention.

FIG. 7 shows a second embodiment of the present invention where the throttle valve 34 is not provided in order to reduce pumping loss. Accordingly, an accelerator pedal depressing degree sensor 47a is provided instead of the throttle position sensor 47 so as to apply an accelerator pedal depressing degree $\phi$ to the control unit 50. The construction and the operation of the engine is otherwise the same as in the first embodiment. The same references designate same parts in the FIG. 1 and FIG. 7.

Figure 8A:
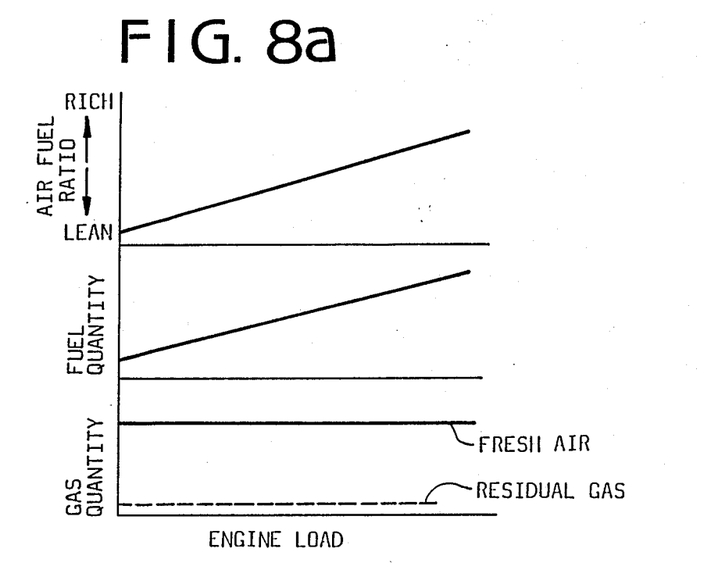
FIG. 8a is a graph showing characteristics of air-fuel ratio, fuel quantity and gas quantity in accordance with engine load in a modification of the second embodiment.
Figure 8B:
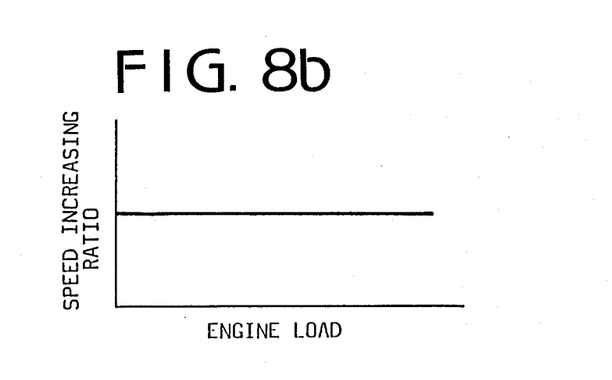
FIG. 8b is a graph showing a relationship between transmission ratio and engine load in the modification.

In a modification of the second embodiment, the transmission ratio of the transmission 40 is kept at a relatively large value (FIG. 8b) so that a large quantity of air is supplied to the cylinder 2 (FIG. 8a). Since the fuel injected from the injector 10 increases with increase of the engine load, the air-fuel mixture becomes rich at heavy load. Thus, engine torque increases with the engine load.

Figure 9:
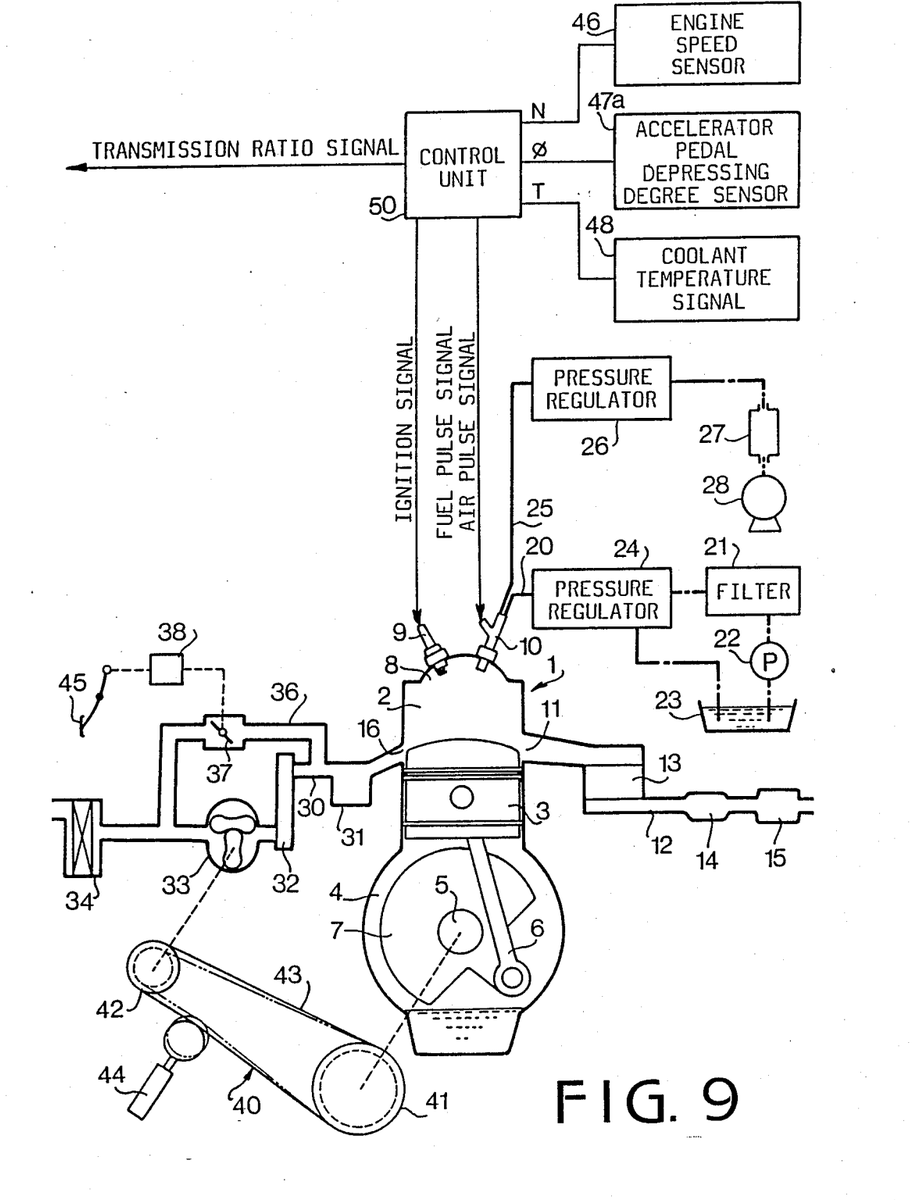
FIG. 9 is a schematic diagram of a two-stroke engine of a third embodiment of the present invention.
Figure 10A:
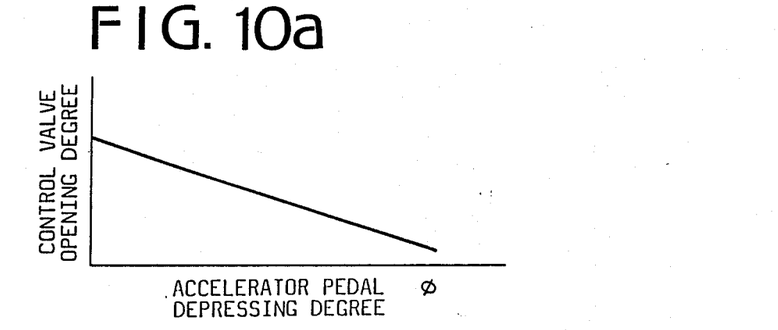
FIG. 10a is a graph showing a relationship between accelerator pedal depressing degree and control valve opening degree.

Referring to FIG. 9 showing a third embodiment of the present invention, the two-stroke engine 1 is provided with a bypass 36 around the scavenge pump 33 and the intercooler 32. The bypass 36 is provided with a control valve 37 which is operatively connected with the accelerator pedal 45 through a valve controller 38. As shown in FIG. 10a, the opening degree of the control valve 37 is controlled by the controller 38 so as to be inversely proportional to the depressing degree of the accelerator pedal 45.

Figure 10B:
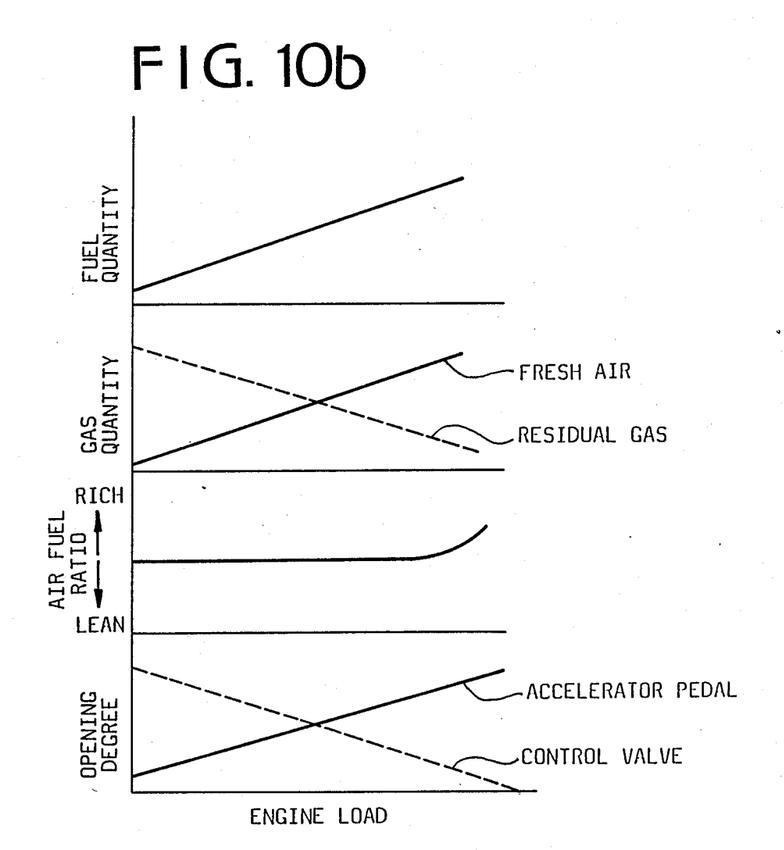
FIG. 10b is a graph showing characteristics of fuel quantity, gas quantity, air-fuel ratio and control valve opening degree in accordance with engine load.

In operation, in a light engine load range where the depressing degree of the accelerator pedal is small, the control valve 37 is largely opened. As a result, a large amount of air is returned to the upstream of the scavenge pump 33. Thus, a small amount of air, which corresponds to the small accelerator depressing degree, flows into the cylinder 2 for scavenging without causing pumping loss. As the depressing degree $\phi$ increases, the quantity of fresh air forced into the cylinder 2 increases with the closing of the control valve 37. Thus, the residual gas is flushed out as shown in FIG. 10b.

The third embodiment may be modified so as to set the opening degree of the control valve 37 at a constant degree and the transmission ratio at a constant value in a light engine load range as in the first embodiment. The third embodiment may be further modified so as to fix the transmission ratio of the transmission 40 at a high value as described in the description of the second embodiment.

Figure 11:
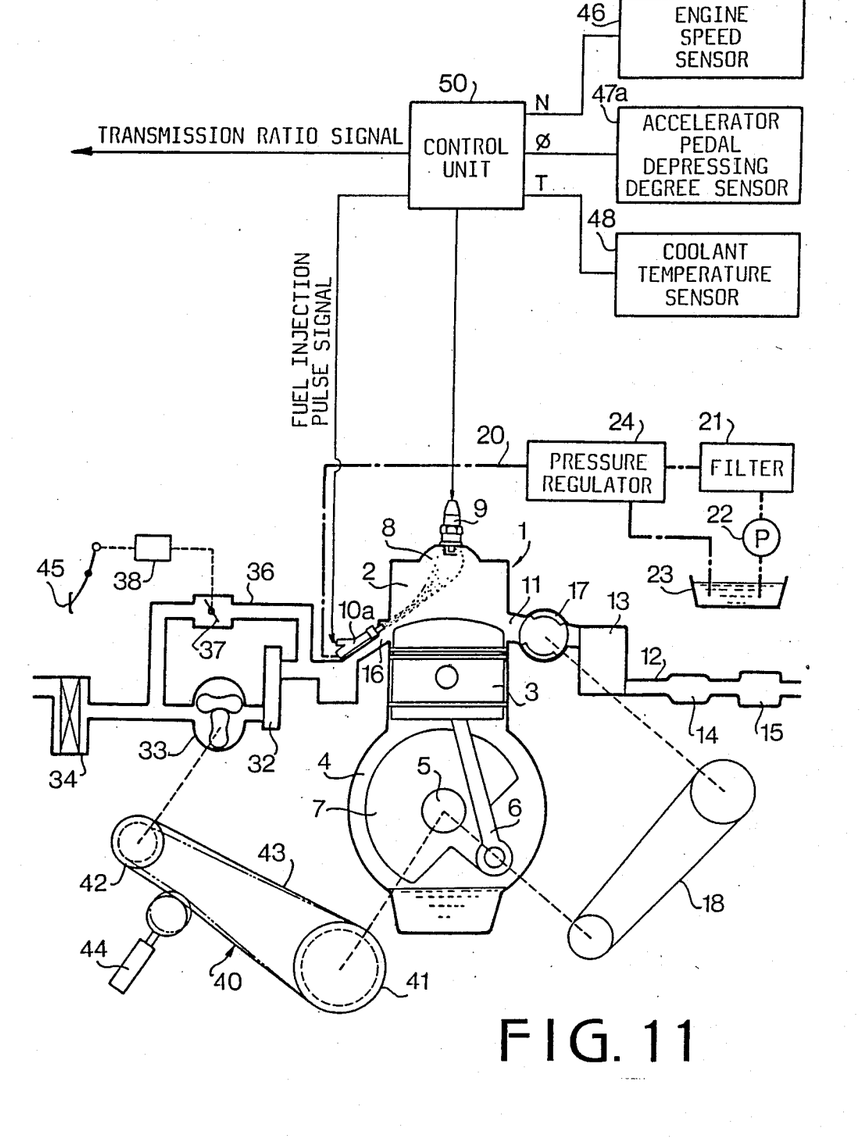
FIG. 11 is a schematic diagram of a two-stroke engine of a fourth embodiment of the present invention.

In a fourth embodiment shown in FIG. 11, the present invention is applied to a control system of a two-stroke engine provided with a low-pressure fuel injector A direct high-pressure injector employed in the first to third embodiment is preferable in that the fuel can be directly injected into the combustion chamber 8 after the exhaust port 11 closes. Thus, the fuel does not escape through the exhaust port 11 so that injection pulse width becomes longer. However, the fuel must be injected at higher pressure than that of the combustion chamber 8 and the injector must be made so as to bear the high pressure and heat caused by combustion gas. The low-pressure fuel injector is provided in a scavenge port. Accordingly, fuel is injected at a low pressure.

Referring to FIG. 11, a low-pressure fuel injector 10a is provided in the scavenge port 16 so as to inject fuel in the chamber 8. Fuel in the tank 23 supplied to the injector 10a by the fuel pump 22 through the fuel passage 20 having the filter 21 and pressure regulator valve 24. Since the fuel must be injected in a short time, the pressure of fuel is kept at a relatively high pressure, for instance, at 10 kg/cm$^2$.

Figure 12:
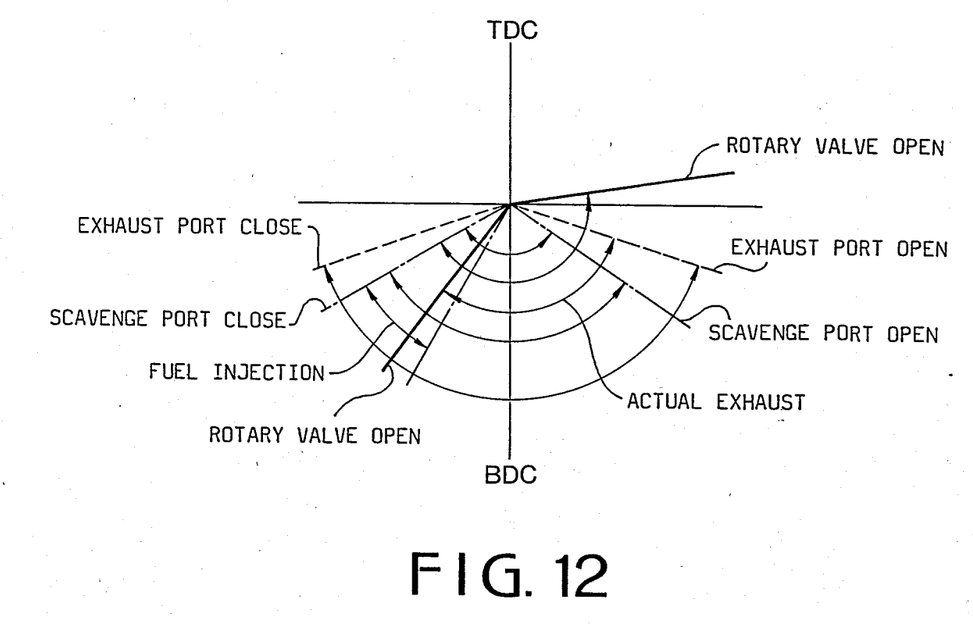
FIG. 12 is a graph showing timing of opening of ports and a rotary valve in the engine of the fourth embodiment.

In order to prevent the fuel from escaping through the exhaust port 11, a rotary exhaust valve 17 is provided therein. The rotary exhaust valve 17 is operatively connected with the crankshaft 5 through a pulleys and belt device 18 so as to be operated in accordance with the angular position of the crankshaft 5 and with the position of the piston 3. As shown in FIG. 12, the opening and closing of the exhaust port 11 indicated by dotted lines are symetrically positioned with respect to the bottom dead center (BDC). The opening and closing of the scavenge port 16 shown by chain lines are also symetrically positioned, forming a smaller angle than the angle of the opening of the exhaust port 11. The rotary valve 17 is adapted to open and close before the exhaust port 11 opens and closes.

Other parts are the same as in the third embodiment and the same references as FIG. 9 designates same parts as FIG. 9.

Figure 13:
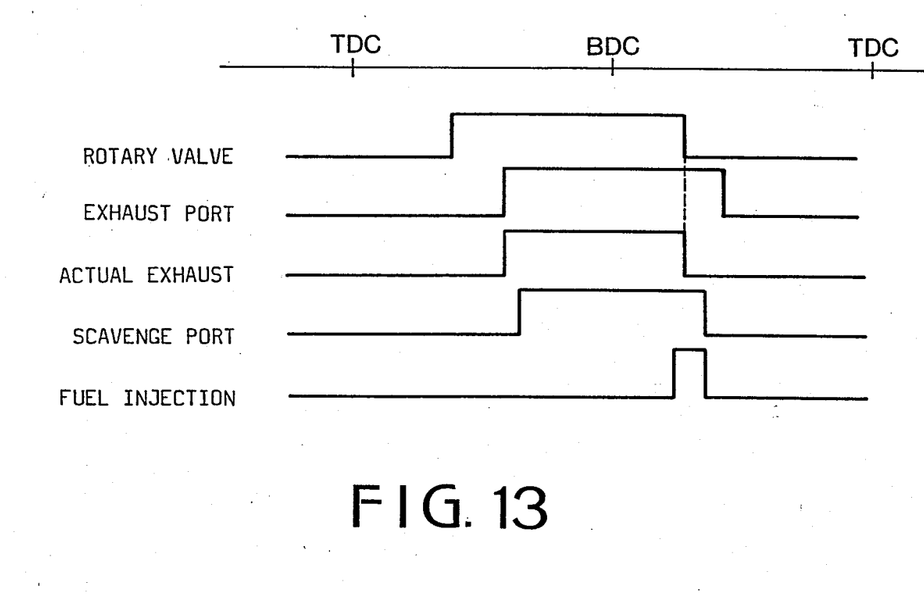
FIG. 13 is a time chart describing the operation of the engine.

In operation, as shown in a time chart of FIG. 13, when the piston 3 descends in combustion and exhaust strokes, the rotary valve 17 is opened. When the exhaust port 11 opens, a part of residual burned gas is flushed out, forced by the pressure in the cylinder 2. As the scavenge port 16 opens, a fresh air is delivered by the pump 33, thereby generating scavenge current for further exhausting the gas. Thus, the air is supplied while sufficiently scavenging the cylinder 2.

As the piston 3 starts to rise, from the bottom dead center in the intake and compression strokes, the rotary valve 17 closes before the scavenge port 16 closes. The pressurized fuel is injected from the injector 10a through the scavenge port 16 immediately before the rotary valve 17 starts to close and before the scavenge port 16 closes. Consequently, although the exhaust port 11 is opened, there is not a chance for the fuel to escape there through. The injected fuel is mixed with fresh air in the cylinder 2 and when the scavenge port 16 is closed, the supply of fresh air and fuel is stopped. Furthermore, the exhaust port 11 closes so that the mixture of the injected fuel and the fresh air is compressed, and the mixture is ignited by the spark plug 9, immediately before the top dead center.

The operations of the control unit 50 and the transmission 40 are the same as in the previously described embodiments.

From the foregoing, it will be understood that the present invention provides a two-stroke engine where scavenge pressure of intake air generated by the scavenge pump is optimumly controlled in accordance with the engine operating conditions. Accordingly, sufficient fresh air is supplied to the cylinder, thereby preventing misfire and improving fuel consumption and torque characteristics.

While the presently preferred embodiments of the present invention have been shown and described, it is to be understood that these disclosures are for the purpose of illustration and that various changes and modifications may be made without departing from the scope of the invention as set forth in the appended claims.

What is claimed is:

1. A system for scavenging for a two-stroke engine having at least one cylinder, a scavenge port, an exhaust port, an intake passage communicated with said scavenge port, an exhaust passage communicated with said exhaust port, a fuel injector, and a scavenge pump provided in said intake passage, the system comprising:

a transmission ratio changing means operatively connecting said scavenge pump and a crankshaft of said engine for operating said scavenge pump;

an actuator for changing the transmission ratio of said transmission;

sensing means for detecting load on said engine and for producing a load signal; and control means responsive to said load signal for operating said actuator so as to control increasing speed of said transmission ratio in accordance with the load.

2. The system according to claim 1, wherein said control means is provided for increasing said ratio with increase of the load.

3. The system according to claim 1, wherein said transmission ratio changing means is a continuously variable transmission.

4. The system according to claim 1, wherein said fuel injector is provided in said cylinder.

5. The system according to claim 1, wherein said fuel injector is provided in said scavenge port.

6. The system according to claim 1, further comprising a throttle valve provided in said intake passage at upstream of said scavenge pump.

7. The system according to claim 1, further comprising a throttle valve provided in a bypass provided around said scavenge pump.

8. The system according to claim 1, further comprising an exhaust valve provided in said exhaust passage, driving means operatively connecting said exhaust valve with a crankshaft of said engine for operating said exhaust valve.

* * * * *